May 7, 1968 J. THOMPSON 3,382,169
PROCESS FOR DEIONIZING AQUEOUS SOLUTIONS
Original Filed Feb. 11, 1963 2 Sheets-Sheet 1
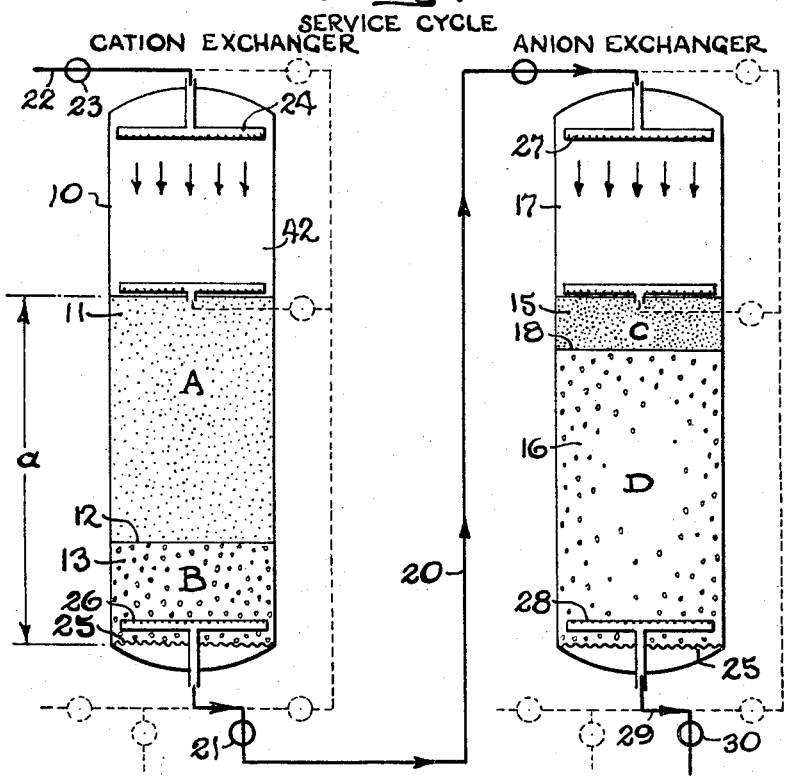
Fig. 1 SERVICE CYCLE
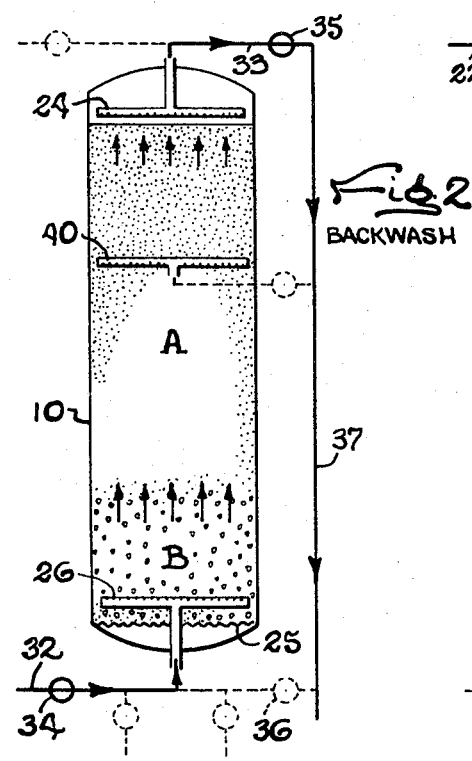
Fig. 2 BACKWASH
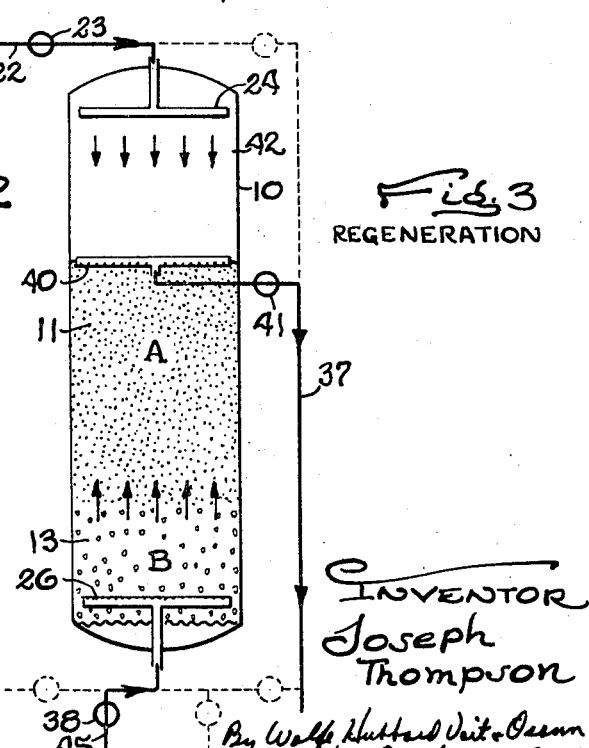
Fig. 3 REGENERATION
INVENTOR
Joseph Thompson
By Wolf, Hubbard, Voit & Osann
ATTORNEY

WET SCREEN ANALYSIS  TYPE A RESIN FINE

WET SCREEN ANALYSIS  TYPE B RESIN COARSE

WET SCREEN ANALYSIS  TYPE C RESIN FINE

WET SCREEN ANALYSIS  TYPE D RESIN COARSE

INVENTOR
Joseph Thompson
ATTORNEYS

United States Patent Office 3,382,169
Patented May 7, 1968

3,382,169
PROCESS FOR DEIONIZING AQUEOUS
SOLUTIONS
Joseph Thompson, East Amwell Township, Hunterdon County, N.J., assignor to Illinois Water Treatment Co., Rockford, Ill., a corporation of Illinois
Continuation of application Ser. No. 257,537, Feb. 11, 1963. This application Apr. 4, 1966, Ser. No. 544,657
7 Claims. (Cl. 210—32)

This application is a continuation of my prior application Ser. No. 257,537, filed Feb. 11, 1963, now abandoned.

This invention relates to a process for deionizing aqueous solutions such as well water which may contain a wide variety of dissolved salts of both weak acids such as carbonates and of strong acids such as chlorides and sulphates.

Heretofore, such water is sometimes deionized by flowing the same successively through four separate tanks respectively containing beds of carboxylic or weak acid type (A) of cation exchange resin, sulphonic or strong acid type (B) of cation exchange resin, styrene or weak base type (C) of anion exchange resin and quaternary or strong base type (D) anion exchange resin. Alternatively, depending on the character of the solids to be removed, the deionization may be effected by three resins in separate tanks, for example A and B plus C or D or A or B plus C and D. In each instance, the bed in each tank must be of a prescribed depth and each is backwashed, regenerated, and rinsed in its separate tank.

The general object of the present invention is to substantially reduce the cost of the equipment required for practicing the foregoing three and four-bed processes while at the same time providing for more economical use of the resins.

Another object is to correlate more closely than has been possible heretofore the volume of each of the resins with the particular ions which it removes.

A more detailed object is to arrange the beds of the cation exchange resins A and/or B in one tank and the beds of the anion exchange resins C and/or D in a second tank and backwash, regenerate and rinse the pairs of beds in their respective tanks while maintaining the beds of each pair accurately stratified and separated at all times.

Other objects and advantages of the invention will become apparent from the following detailed description taken in connection with the accompanying drawings, in which FIGURE 1 is a schematic layout and flow diagram of apparatus for practicing the improved process.

FIGS. 2 and 3 are similar views showing the flow patterns for backwashing and regeneration.

Figure 4:
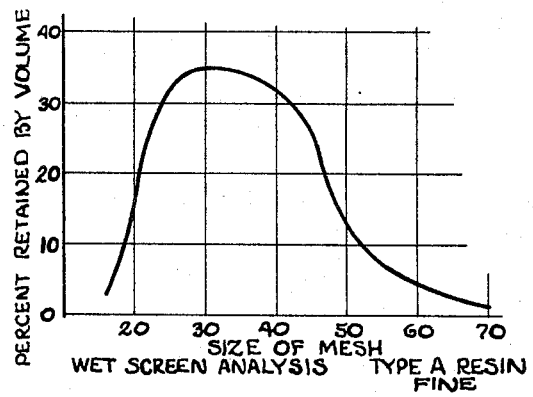
FIGS. 4 to 7 are curves showing the particle size distribution or wet screen analysis of the four different resins.

The improved process is especially suited for the economical deionization of water in which the hardness is attributable largely to bicarbonates of calcium and magnesium but which contain substantial amounts of sodium and of chlorides and sulphates. Accordingly, the process will be described in connection with the deionization of water of this general character.

The A resin initially contacted by the water to remove the cations of the dissolved salts of weak acids is of the type (R COOH) in which the hydrogen ion of the carboxyl group is replaceable by the calcium and magnesium ions and to a lesser degree by the sodium ions associated with carbonic acid. One currently available resin of this type is sold by Rohm & Haas by the designation IRC-50.

This resin comprises spherical beads which have an actual wet density of 1.09 grams per cc. and which, in the calcium or magnesium forms are about 40 percent larger than in the regenerated or hydrogen form. Substantially greater swelling occurs during conversion to the sodium form. This type of resin may be regenerated by a weak solution of a strong acid such as sulphuric.

The B or sulphonic type resin ($RSO_3H$), although possessing substantially lesser cation exchange capacity, is capable of exchanging hydrogen for all cations. Resins of this type are sold under the designation of IR-120 (Rohm & Haas) and Dowex 50 (Dow Chemical Co.). They possess an actual wet density of 1.28 grams per cc. and the beads shrink in volume in being converted from the hydrogen form, the shrinkage being about 7 percent in the case of sodium form. To regenerate this resin, a strong solution of sulphuric acid is ordinarily used.

The weak base or styrene type (C) of anion exchange resin has an $NH_2$ group which combines with and removes the strong acids in the water. A resin of this type sold by Rohm & Haas by the designation IR-45 and by Dow as Dowex 3 possesses an actual wet density of 1.05 and the beads thereof swell about 15 percent during exhaustion of the resin. Such resin would be used where it is desired to leave the effluent substantially free of chloride and sulphate anions.

For the strong base anion exchange resin (D), one sold by Rohm & Haas as IRA-400 or by Dow as Dowex 1 is preferably employed. This is a so-called quaternary compound having an OH group replaceable by the weak acid anion ($HCO_3$) to form water. The beads of this resin shrink about 20 percent in volume during the exchange reaction and the actual wet density is 1.12. Such a resin is especially suited for the efficient removal of weak acids.

When using the resins above described to deionize water containing the constituents mentioned above, it is necessary, in order to achieve intimate surface contact and optimum exchange efficiency that the water to be deionized be passed downwardly through each of the four beds and in a predetermined sequence, namely, through the A, B, C and D successively. In prior systems, the four resins have been confined in separate tanks, each tank containing enough resin to provide the prescribed minimum depth, usually about thirty inches. It is impossible therefore in the case of all of the different waters to be deionized to correlate accurately the amount of relatively costly A resin with the weak acid salts found in each particular water and similarly tailor the exchange capacity of the beds of the B, C and D resins with a particular water analysis.

The present invention greatly simplifies and reduces the cost of the apparatus required for deionizing any given aqueous solution using the cation resins A and B or the anion resins C and D in pairs while at the same time permitting the volumes of the different resins to be tailored closely to correspond with the different cations and and anions present in a particular water to be deionized. For these purposes, I confine a proper volume of each of the two cation resins in one tank 10 with the bed 11 of the A resin disposed above but in contact with the top 12 of the bed 13 of the B resin, the two resins having a combined depth $a$ greater than the prescribed minimum and being maintained stratified during the downward flow of the raw water through the two in the deionizing cycle and while the two beds are being backwashed and then regenerated simultaneously after exhaustion thereof. Similarly, where both the anion exchange resins C and D are to be used, the beds 15 and 16 are confined one above the other in a single tank 17 and in contact along a junction line 18. As with the cation resins, the resins C and D, after exhaustion by the flow of the decationized water downwardly therethrough, are backwashed and regenerated simultaneously in the second tank.

To achieve the foregoing, the present invention first takes advantage of the fact that the actual densities of the resins A and C of the upper beds of the two pairs are substantially lower than the densities of the lower resins B and D, this relation being in the proper direction to assist in stratifying the resins in each tank during backwashing thereof. As set forth above, the density of the B resins is greater than that of the A resin by .17 grams per cc. while the heavier resin D exceeds the density of the C resin by .07.

These differences are insufficient to insure complete stratification of the resins in each tank at the flow rates normally used in backwashing such resins. This deficiency is overcome in accordance with the present invention by increasing the bead size of the B and D resins as compared to A and C resins and thus provide the desired difference between the effective densities of the A and B resins on the one hand and the C and D resins on the other hand. The term "effective density" contemplates a combination of the actual density as set forth above and the size of the resin determinative of the height to which the beads will rise and remain suspended in an upwardly moving column of backwashing water at a given temperature.

Figure 5:
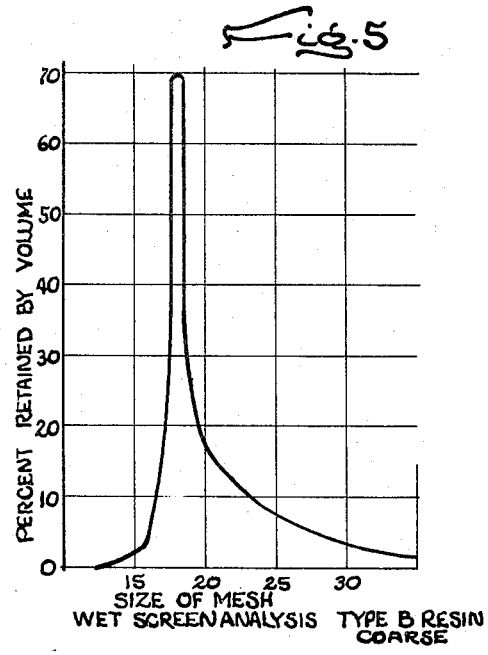
Figure 6:
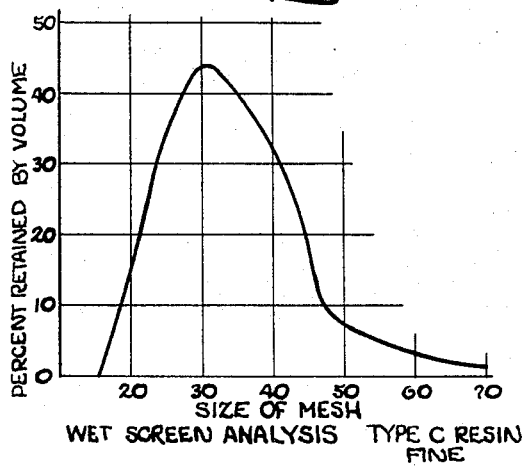
Figure 7:
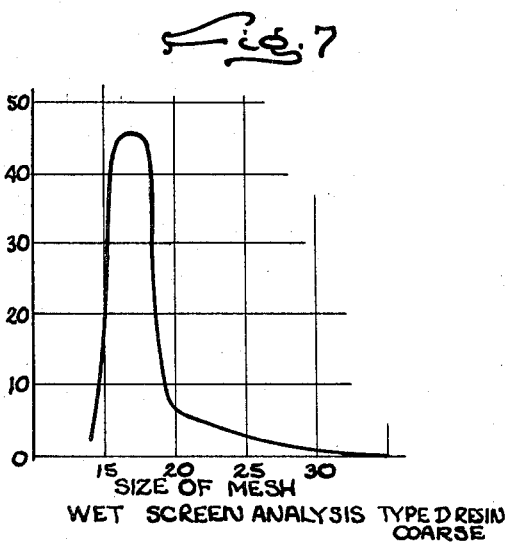

The desired difference in bead size may be achieved by selecting resins which have particle size distributions such as those shown in FIGS. 4 to 7 which show the wet screen analysis of commercial currently available resins of the A, B, C and D types above identified. It will be observed that the A resin is not only smaller in mesh size (16–50 mesh as compared with 14–20) but that the particles are distributed over a wider range of screen sizes than the beads of the B resin. The same general relation of range and concentration of the larger beads obtains in the denser D resin (15–20) mesh as compared with the C resin in which the beads are of smaller mesh size and are distributed over a much wider range (16–50 mesh).

By employing resins having particle sizes such as is illustrated in FIGS. 4 to 7, the difference in effective densities between the two resins in each of the two tanks is increased substantially beyond that attributable to the difference in actual densities alone. It has been found that by thus widening the difference in effective densities, complete and accurate stratification of the resins A and B or C and D may be achieved during the flow of water upwardly through the tank at a normal backwashing rate and temperature. During such backwashing, the two resins remain classified and suspended in upper and lower portions of the upwardly flowing water columns (see FIG. 2) and settle down as the backwashing is discontinued to form two separate beds (FIG. 1) in contact with each other along well defined lines.

To practice the improved process using all four of the resins A, B, C and D, the two tanks 10 and 17 are connected in series relation by a pipe 20 and a valve 21 as shown in FIG. 1, and the raw water is delivered through a pipe 22 and a valve 23 to a distributor 24 in the upper part of the tank containing the beds 11 and 13 of the A and B resins which are supported on a screen 25 near the bottom of the tank. The decationized effluent flows out of the lower end of the tank through a distributor 26 and is forced through the valve 21 and pipe 20 and into the upper end of the tank 17 through a distributor 27 and then downwardly through the tank and the resin beds C and D and finally out through a distributor 28 and a deionized water outlet 29 having a valve 30 therein.

After the resins have become exhausted, the A and B resins are backwashed in the tank 10 and the C and D resins in the tank 17. This is accomplished in the case of the A and B resins by flowing water from a supply line 32 through a valve 34 into the bottom of the tank 10 and at the proper rate and temperature to expand the beds throughout the major height of the tank as illustrated in FIG. 2 with the water escaping to a drain line 37 through an outlet pipe 33 while valves 34 and 35 are open and a valve 36 closed, the other valves of the unit being closed as indicated by the dotted lines. The resin particles thus become loosened and suspended in the upwardly flowing stream in which the particles of the different resins remain stratified accurately owing to the wide differences in their effective densities as described above. Now, when the upward flow of water is interrupted by closure of the valve 34, the two strata settle downwardly and reform the accurately defined beds 11 and 13 as shown in FIG. 2 preparatory to regeneration of the two resins.

Most economical and efficient regeneration of the backwashed beds A and B, particularly after they have been exhausted by water containing substantial amounts of sodium salts, may be achieved by flowing upwardly from a supply line 45 and successively through the B and A beds along a flow path shown in full in FIG. 3 including an open valve 38 solutions of sulphuric acid, first one to two percent to avoid calcium sulphate precipitation in the bed A and then five to ten percent as required for most efficient regeneration of the sulphonic type B resin. As illustrated in FIG. 3, the excess regenerant escapes from the tank through an intermediate distributor 40 disposed substantially in the plane of the top of the bed A in the settled condition of the resin beds, the flow to the drain line 37 being controlled by a valve 41. The resin beds are held in this compacted condition by the flow of water from the pipe 22 and valve 23 into the upper end of the tank and the downward flow through the free board space 42 to the distributor 40 through which it escapes with the excess regenerant, if any. The upflow of the regenerant and the downflow of the water are correlated by adjusting the valves 23, 38 and 41 so as to insure proper meeting of the water and regenerant solutions and escape thereof through the distributor 40. Rinsing of the regenerated resins is accomplished by following up the upward flow of regenerating solution in the same manner through the two beds with water admitted from the supply pipe 32.

Backwashing, regeneration, and rinsing of the exhausted C and D resins are effected in the tank 17 in the same manner above described. In this case, the regenerant is, in accordance with accepted practice, a two to ten percent solution of caustic soda.

The numerous advantages of the improved process are demonstrated by the results of extensive tests in deionizing a typical midwest well water having the following analysis:

| Cations: | P.p.m. as $CaCO_3$ |
|---|---|
| $Ca^{++}$ | 228.0 |
| $Mg^{++}$ | 135.0 |
| $Na^+$ | 16.0 |
| Total | 379.0 |

| Anions: | P.p.m. as $CaCO_3$ |
|---|---|
| $HCO_3^-$ | 348.0 |
| $Cl^-$ | 9.0 |
| $SO_4^=$ | 20.0 |
| $NO_3$ | 2.0 |
| Total | 379.0 |

| | P.p.m., as $CaCO_3$ |
|---|---|
| Free $CO_2$ | 9 |
| $SiO_2$ | 8 |

Knowing the exchange capacities of the different resins described above, it was calculated that the total volume of the cation exchange resins should be divided into 72 percent of A and 28 percent B while the anion exchange resins should be divided 13 percent C and 87 percent D. The pairs of beds of cation and anion resins in these ratios by volume were arranged in columns 30 inches deep in 1 13/16 x 54 inch glass tubes coupled together and equipped to provide the various service, backwash, regeneration, and rinse flow patterns described above.

Backwashing of the resins was effected in a period of ten minutes at an upflow rate of 5.5 gallons per minute per square foot of column cross section for the cation resins and three gallons for the anion resins and a temperature of 62° F. Regeneration flow rate was at a rate 1.25 gallons per minute per cubic foot of cation resins, and 0.25 gallons for the anion resins. A four percent solution of cautic soda was used as a regenerant for the anion exchange resins. For the cation resins, 50 percent of the sulphuric acid in a one percent solution was passed upwardly through the beds 13 and 11 to avoid calcium sulphate precipitation in the bed of A resin. The remainder of the acid was a five percent solution.

After regeneration of the resins, each service cycle was conducted successively through the tanks by a downward flow of the raw water at 62° F. at the rate of five gallons per minute per square foot of the column area. Exhaustion of the resins was determined by an increase in the conductivity of the deionized water as indicating an ion break-through.

In each of a number of service cycles, an average of 16.5 kilograins of cations per cubic foot of resin (calculated as (CaCO₃) were removed from the water using four pounds of sulphuric acid per cubic foot of resin for regeneration, as compared with four pounds (28 kilograins) per cubic foot of resin of sulphuric acid used for regeneration. In the anion exchanger, an average of 15 kilograins of anions (calculated as CaCO₃) per cubic foot of resin were removed and four pounds of caustic soda were used in the regeneration.

From the foregoing, it will be apparent that minimum volumes of the A, B, C and D resins may be utilized at optimum exchange capacity to provide a desired deionizing capacity and with equipment far less costly than heretofore employed.

The two-tank, four-bed system above described is especially suited for the most efficient deionization of aqueous solutions containing substantial amounts of the salts of both weak and strong acids.

Where the solution to be deionized is strongly alkaline and contains only a small amount of chlorides and sulphates, the desired high efficiency may be achieved while using only one of the resins C or D in the anion exchange tank. In such a three-resin, two-tank installation, the C resin would be used where the removal of strong acid anions is of prime importace. On the other hand, if it is desired to leave the effluent substantially free of weak acids, including silica, the D resin would normally be used as the anion exchanger.

Similarly, if chlorides and sulphates are the predominate contaminants as for example in certain Texas well waters, the A resin may be omitted from the cation exchange tank while using both the C and D resins in the anion exchanger.

I claim as my invention:

1. The process of deionizing an aqueous solution containing calcium and magnesium salts of weak acids including carbonates, bicarbonates and silicates and of strong acids including chlorides and sulphates, said process including the steps of (1) confining in a first tank a lower bed of strong acid type (B) of particulate cation exchange resin and an upper bed of weak acid type (A) of a particulate cation exchange resin, the volumes of said A and B resins being proportioned in accordance with the respective amounts of the cations of said weak acids and of said strong acids in said solution, said B resin, both when regenerated and when exhausted, having greater actual density and larger average particle size than said A resin so as to possess an effective density sufficiently greater than the effective density of said A resin to maintain the two resins stratified during the flow of said water or a regenerating solution vertically through said tank for deionizing, backwashing or regenerating, (2) similarly confining in a second tank an upper bed of a weak base type of particulate anion exchange resin (C) and a lower bed of a strong base type of particulate anion exchange resin (D), said D resin, both when regenerated and exhausted, having a greater actual density and larger size particles than said C resin so as to possess an effective density sufficiently greater than that of said C resin to maintain the two resins stratified during deionizing, backwashing and regenerating cycles, the volumes of said C and D resins being proportioned in accordance with the respective amounts of the weak and strong acid anions in said aqueous solution, (3) flowing said aqueous solution first downwardly through said first tank and successively through said A and B resins and then downwardly through said second tank and successively through said C and D resins whereby to deionize the aqueous solution, (4) backwashing the A and B resins in said first tank and the C and D resins in the second tank after substantial exhaustion of the exchange capacities of the different beds, and (5) thereafter regenerating all of the resins by passing a solution of a strong alkali vertically through said second tank and successively through the beds therein and a solution of a strong acid vertically through said first tank and successively through the beds therein.

2. The process of removing from an aqueous solution cations including sodium, calcium and magnesium salts of weak acids including carbonates, bicarbonates, and silicates and of strong acids including chlorides and sulphates, said process including the steps of (1) confining in a tank a lower bed of strong acid type (B) of particulate cation exchange resin and an upper bed of weak acid type (A) of a particulate cation exchange resin, the volumes of said A and B resins being proportioned in accordance with the respective amounts of the cations of said weak acids and of said strong acids in said solution, said B resin, both when regenerated and when exhausted, having greater actual density and larger average particle size than said A resin so as to possess an effective density sufficiently greater than the effective density of said A resin to maintain the two resins stratified during the flow of said aqueous solution or a regenerating solution vertically through said tank for decationizing backwashing or regenerating, (2) flowing said aqueous solution first downwardly through said tank and successively through said A and B resins, (3) backwashing said A and B resins in said tank after substantial exhaustion of the cation exchange capacity thereof, and (4) finally, regenerating said resins in said tank by passing a solution of a strong acid vertically through said tank and successively through the resin beds therein.

3. The decationizing process as defined in claim 2 including the flowing of said acid regenerating solution upwardly.

4. The process of removing from an aqueous decationized solution the anions of weak and strong acids, said process including the steps of (1) confining in a tank a lower bed of strong base type (D) of particulate anion exchange resin and an upper bed of weak base type (C) of a particulate anion exchange resin, the volumes of said C and D resins being proportioned in accordance with the respective amounts of the anions of said weak acids and of said strong acids in said solution, said D resin, both when regenerated and when exhausted, having greater actual density and larger average particle size than said C resin so as to possess an effective density sufficiently greater than the effective density of the C resin to maintain the two resins stratified during the flow of said solution or a regenerating solution vertically through said tank for deanionizing, backwashing or regeneraitng, (2) flowing said aqueous solution first downwardly through said tank and successively through said C and D resins, (3) backwashing said C and D resins in said tank after substantial exhaustion of the anion exchange capacity thereof, and (4) finally, regenerating said resins in said tank by passing a solution of a strong alkali vertically through said tank and successively through the resin beds therein.

5. A process as defined in claim 4 including the flowing of said alkali solution vertically through said tank and successively through the resin beds therein.

6. The process of removing from an aqueous solution cations of weak acids and of strong acids, said process including the steps of (1) confining in a tank a lower bed of strong acid type (B) of particulate cation exchange resin and an upper bed of weak acid type (A) of a particulate cation exchange resin, the volumes of said A and B resins corresponding to the respective amounts of the cations of said weak acids and of said strong acids in said solution, said B resin, both when regenerated and when exhausted, having greater actual density and larger average particle size than said A resin so as to possess an effective density sufficiently greater than the effective density of said A resin to preserve the stratification of the two resins stratified during the flow of said aqueous solution or a regenerating solution vertically through said tank for decationizing, backwashing or regeneratign, (2) flowing said aqueous solution first downwardly through said tank and successively through said A and B resins, (3) backwashing said A and B resins in said tank after substantial exhaustion of the cation exchange capacity thereof while maintaining the resins in a stratified condition, and (4) finally, regenerating said resins in said tank by passing a solution of a strong acid vertically through said tank and successively through the stratified resin beds therein.

7. The process of removing from an aqueous decationized solution the anions of weak and strong acids, said process including the steps of (1) confining in a tank a lower bed of strong base type (D) of particulate anion exchange resin and an upper bed of weak base type (C) of a particulate anion exchange resin, the volumes of said C and D resins corresponding to the respective amounts of the anions of said weak acids and of said strong acids in said solution, said D resin, both when regenerated and when exhausted, having greater actual density and larger average particle size than said C resin so as to possess an effective density sufficiently greater than the effective density of the C resin to maintain the two resins stratified during the flow of said solution or a regenerating solution vertically through said tank for deanionizing, backwashing or regenerating, (2) flowing said aqueous solution first downwardly through said tank and successively through said C and D resins, (3) backwashing said C and D resins in said tank after substantial exhaustion of the anion exchange capacity thereof while maintaining the stratified condition thereof, and (4) finally, regenerating said resins in said tank by passing a solution of a strong alkali vertically through said tank and successively through the resin beds therein.

References Cited

UNITED STATES PATENTS 2,660,558   11/1953   Juda _____ 210—38 X
2,917,368   12/1959   Juda _____ 210—24 X SAMIH N. ZAHARNA, *Primary Examiner.*

MORRIS O. WOLK, *Examiner.*

Disclaimer 3,382,169.—*Joseph Thompson*, East Amwell Township, Hunterdon County, N.J. PROCESS FOR DEIONIZING AQUEOUS SOLUTIONS. Patent dated May 7, 1968. Disclaimer filed Feb. 4, 1972, by the assignee, *Illinois Water Treatment Co.*

Hereby enters this disclaimer to claims 2, 3 and 6 of said patent.

[*Official Gazette March 14, 1972.*]